United States Patent
Hirasawa et al.

(10) Patent No.: US 8,357,247 B2
(45) Date of Patent: Jan. 22, 2013

(54) MARTENSITIC STAINLESS STEEL FOR DISK BRAKES

(75) Inventors: Junichiro Hirasawa, Chiba (JP); Yoshihiro Ozaki, Chiba (JP); Takumi Ujiro, Chiba (JP); Osamu Furukimi, Chiba (JP)

(73) Assignee: JFE Steel Corporation, Tokyo (JP)

(*) Notice: Subject to any disclaimer, the term of this patent is extended or adjusted under 35 U.S.C. 154(b) by 169 days.

(21) Appl. No.: 10/546,248

(22) PCT Filed: Apr. 23, 2004

(86) PCT No.: PCT/JP2004/005934
§ 371 (c)(1),
(2), (4) Date: Oct. 5, 2005

(87) PCT Pub. No.: WO2004/097058
PCT Pub. Date: Nov. 11, 2004

(65) Prior Publication Data
US 2006/0113008 A1    Jun. 1, 2006

(30) Foreign Application Priority Data
Apr. 28, 2003  (JP) .................. 2003-124027

(51) Int. Cl.
*C22C 38/18* (2006.01)
*H01F 1/00* (2006.01)

(52) U.S. Cl. ...... 148/310; 420/34; 420/60; 188/218 XL; 148/400

(58) Field of Classification Search .......... 148/400, 148/310; 188/218 XL; 420/34, 60
See application file for complete search history.

(56) References Cited

U.S. PATENT DOCUMENTS

| | | | |
|---|---|---|---|
| 5,017,246 A * | 5/1991 | Miyasaka et al. | 148/605 |
| 5,171,384 A * | 12/1992 | Igawa et al. | 148/611 |
| 5,979,614 A | 11/1999 | Takahashi et al. | |
| 6,464,803 B1 | 10/2002 | Tendo et al. | |
| 2002/0036036 A1 * | 3/2002 | Muraki et al. | 148/610 |

(Continued)

FOREIGN PATENT DOCUMENTS

EP   1 106 705 A1   6/2001
EP   1 199 374 A1   4/2002

(Continued)

*Primary Examiner* — Nicholas P D'Aniello
(74) *Attorney, Agent, or Firm* — Oliff & Berridge, PLC

(57) ABSTRACT

A martensitic stainless steel, having high temper softening resistance, for disc brakes is provided. The martensitic stainless steel is not seriously softened by maintaining the steel at more than 600° C. The steel has a hardness of 32 or more or a hardness of 30 or more in HRC after the steel is tempered at 650° C. for one hour or tempered at 670° C. for one hour, respectively. In particular, the martensitic stainless steel for disc brakes contains less than 0.050 mass % carbon, 1.0 mass % or less silicon, 2.0 mass % or less manganese, 0.04 mass % or less phosphorus, 0.010 mass % or less sulfur, 0.2 mass % or less aluminum, more than 11.5 mass % to 15.0 mass % chromium, 0.5 mass % to 2.0 mass % nickel, more than 0.50 mass % to 4.0 mass %. copper, more than 0.08 mass % to 0.6 mass % niobium, and less than 0.09 mass % nitrogen, the remainder being iron and unavoidable impurities. The carbon content, the nitrogen content, the niobium content, the chromium content, the silicon content, the nickel content, the manganese content, and the copper content satisfy the following inequalities (1) and (2):

$$0.03 \leq [C]+[N]-13/93\times[Nb] \leq 0.09 \quad (1)$$

$$5\times[Cr]+10\times[Si]+30\times[Nb]-9\times[Ni]-5\times[Mn]-3\times[Cu]-225\times[N]-270\times[C] \leq 40 \quad (2).$$

21 Claims, 1 Drawing Sheet

FRICTION SECTION RUBBED WITH PAD

U.S. PATENT DOCUMENTS

| | | |
|---|---|---|
| 2002/0066627 A1 | 6/2002 | Tsuge et al. |
| 2002/0084005 A1 | 7/2002 | Hiramatsu et al. |
| 2002/0102178 A1* | 8/2002 | Hiramatsu et al. .............. 420/46 |
| 2004/0096352 A1 | 5/2004 | Ozaki et al. |

FOREIGN PATENT DOCUMENTS

| | | |
|---|---|---|
| EP | 1 236 809 A2 | 9/2002 |
| EP | 1 314 791 A1 | 5/2003 |
| JP | A-59-070748 | 4/1984 |
| JP | A-10-152760 | 6/1998 |
| JP | A-2001-220654 | 8/2001 |
| JP | A-2002-121656 | 4/2002 |
| JP | A-2002-146482 | 5/2002 |
| JP | A-2002-146489 | 5/2002 |
| JP | A-2003-073743 | 3/2003 |
| JP | B2-3422864 | 4/2003 |

* cited by examiner

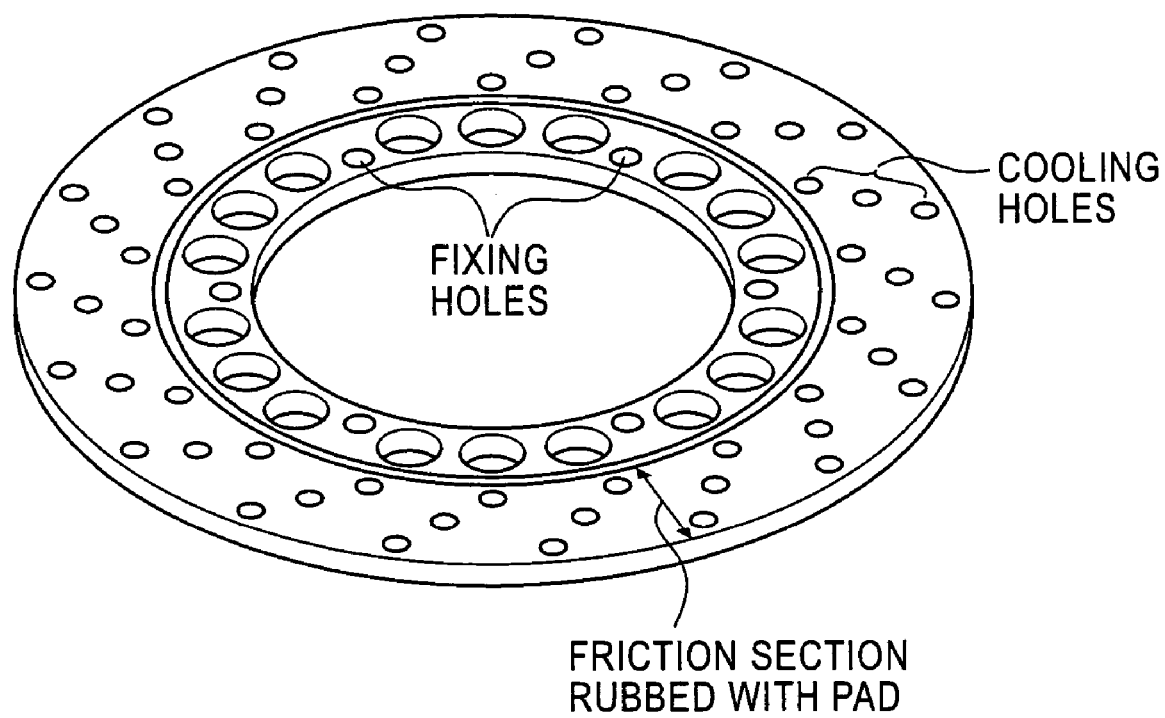

MARTENSITIC STAINLESS STEEL FOR DISK BRAKES

TECHNICAL FIELD

The present invention relates to martensitic stainless steels for brake discs (hereinafter referred to as discs) included in disc brakes for motorcycles, motorcars, bicycles, and other vehicles. An example of such disc brakes is shown in FIG. 1. The present invention particularly relates to a martensitic stainless steel for disc brakes which are hardly softened but have an initial proper hardness after the disc brakes are maintained at high temperature for a long time by friction heat during braking, that is, which are superior in temper softening resistance (hereinafter referred to as high-temperature softening resistance).

BACKGROUND ART

Disc brakes for motorcycles and other vehicles have a function of slowing the rotation of wheels by the friction between discs and pads. The temperature of the discs is greatly increased due to friction heat generated during braking. In recent years, in order to achieve high fuel efficiency to protect the Earth's environment, vehicles have been reduced in weight and the discs have been therefore reduced in thickness. Since a reduction in disc thickness results in a reduction in heat capacity, the temperature of the discs is greatly increased by friction during braking. Therefore, there is a possibility that the discs are rapidly worn away because the discs are tempered and softened.

In view of hardness and corrosion resistance, a low-carbon martensitic stainless steel containing 12% chromium and 0.06% carbon on a mass basis is used to manufacture discs of known disc brakes. The stainless steel is usually machined so as to have a predetermined shape, hardened, and then provided to users. The composition of the stainless steel is designed such that the stainless steel has a hardness of 32 to 38 in HRC (Rockwell C hardness determined according to JIS Z 2245).

After a disc brake made of the martensitic stainless steel is heated to high temperature, particularly 550° C. or more, by friction heat, the hardness thereof is seriously decreased due to the relief of the strain of the disc brake and the precipitation of carbonitrides. Therefore, the hardness of the disc brake can be reduced to less than its lower limit, that is, less than 32 in HRC. In particular, since the discs have been reduced in thickness as described above, the discs need to have high temper softening resistance because the discs are heated to more than 600° C. in some cases.

In order to meet such a need, Japanese Unexamined Patent Application Publication No. 2002-146482 discloses a steel sheet used to improve the disc warpage caused by an increase in temperature. However, the temperature disclosed in this document is up to 600° C. and no technique for improving temper softening resistance, which is a key to prevent the hardness of heated steel sheets from being reduced, is disclosed in the document. Meanwhile, Japanese Unexamined Patent Application Publication No. 2001-220654 discloses another steel sheet with high temper softening resistance. This steel sheet has a hardness of 30 or more in HRC after the steel sheet is maintained at 530° C. or more. However, the hardness of this steel sheet is insufficient because the following steel sheets have been recently demanded: steel sheets that have high temper softening resistance after they are heated to more than 600° C.

It is an object of the present invention to provide a martensitic stainless steel, having high temper softening resistance, for disc brakes. The steel is slightly tempered and softened if the steel is maintained at more than 600° C.; that is, the steel has a hardness of 32 or more or a hardness of 30 or more in HRC after the steel is tempered at 650° C. or 670° C., respectively.

DISCLOSURE OF INVENTION

In order to solve the above problems involved in the known techniques, the inventors have investigated the effect of the composition of martensitic stainless steels on the temper softening resistance. As a result, the inventors have found that such steels can be prevented from being softened due to the relief of strain by adjusting the niobium content and the copper content to proper values to form fine precipitates containing such elements at 500° C. to 700° C. to prevent the movement of dislocation. The inventors have also found that if the steels are maintained at more than 600° C., the hardness of the steels can be maintained high by adjusting the nitrogen content and the nickel content to proper values to prevent carbide precipitates from being formed at high temperature to keep the amount of dissolved carbon to maintain the hardness of martensitic structures.

The present invention, which has been made based on the above findings, provides a martensitic stainless steel for disc brakes. The steel contains less than 0.050 mass % carbon, 1.0 mass % or less silicon, 2.0 mass % or less manganese, 0.04 mass % or less phosphorus, 0.010 mass % or less sulfur, 0.2 mass % or less aluminum, more than 11.5 mass % to 15.0 mass % chromium, 0.5 mass % to 2.0 mass % nickel, more than 0.50 mass % to 4.0 mass % copper, more than 0.08 mass % to 0.6 mass % niobium, and less than 0.09 mass % nitrogen, the remainder being iron and unavoidable impurities. The carbon content, the nitrogen content, the niobium content, the chromium content, the silicon content, the nickel content, the manganese content, and the copper content satisfy the following inequalities (1) and (2):

$$0.03 \leq [C]+[N]-13/93\times[Nb] \leq 0.09 \quad (1)$$

$$5\times[Cr]+10\times[Si]+30\times[Nb]-9\times[Ni]-5\times[Mn]-3\times[Cu]-225\times[N]-270\times[C] \leq 40 \quad (2).$$

Furthermore, the present invention provides another martensitic stainless steel for disc brakes. This steel containing less than 0.050 mass % carbon, 1.0 mass % or less silicon, 2.0 mass % or less manganese, 0.04 mass % or less phosphorus, 0.010 mass % or less sulfur, 0.2 mass % or less aluminum, more than 11.5 mass % to 15.0 mass % chromium, more than 0.50 mass % to 2.0 mass % nickel, more than 0.50 mass % to 4.0 mass % copper, more than 0.08 mass % to 0.6 mass % niobium, and less than 0.09 mass % nitrogen, the remainder being iron and unavoidable impurities. The carbon content, the nitrogen content, the niobium content, the chromium content, the silicon content, the nickel content, the manganese content, and the copper content satisfy the following inequalities (1) and (2):

$$0.03 \leq [C]+[N]-13/93\times[Nb] \leq 0.09 \quad (1)$$

$$5\times[Cr]+10\times[Si]+30\times[Nb]-9\times[Ni]-5\times[Mn]-3\times[Cu]-225\times[N]-270\times[C] \leq 40 \quad (2).$$

The martensitic stainless steels preferably further contain 0.02 mass % to 0.3 mass % vanadium.

The martensitic stainless steels preferably further contain one or more of the following elements:

(1) one or both of 0.02 mass % to 2.0 mass % molybdenum and 0.02% to 2.0 mass % cobalt on a mass basis;
(2) one or more of 0.02 mass % to 0.3 mass % titanium, 0.02% to 0.3 mass % zirconium, and 0.02 mass % to 0.3 mass % tantalum on a mass basis; and
(3) one or both of 0.0005 mass % to 0.0050 mass % boron and 0.0005 mass % to 0.0050 mass % calcium.

The present invention provides a hot-rolled sheet or cold-rolled sheet made of one of the martensitic stainless steels.

BRIEF DESCRIPTION OF THE DRAWINGS

FIG. 1 is an illustration showing an example of a brake disc, including a sheet of steel according to the present invention, for motorcycles.

BEST MODE FOR CARRYING OUT THE INVENTION

The martensitic stainless steel according to the present invention has the above composition and therefore has high temper softening resistance. That is, the steel has a hardness of 32 to 38 in HRC after the steel is hardened and the steel has a hardness of 32 or more or a hardness of 30 or more in HRC after the steel is tempered at 650° C. or 670° C., respectively. Furthermore, the steel has high toughness and corrosion resistance.

The reason for limiting the composition of the steel having the above features to the above range will now be described.

Carbon Content of Less Than 0.050 Percent by Mass

Carbon as well as nitrogen is an element useful in enhancing the hardness of the steel by hardening. In order to achieve such an advantage, the steel preferably contains 0.015 percent or more carbon on a mass basis. When the steel is maintained at more than 600° C., carbon bonds to chromium to form coarse $Cr_{23}C_6$ precipitates; hence, carbon is useless in enhancing the hardness and deteriorates the corrosion resistance because carbon creates rust. An excessive increase in carbon content leads to a reduction in toughness. Therefore, it is necessary to limit the carbon content to less than 0.050 percent by mass. In particular, in order to enhance the toughness and the corrosion resistance, the carbon content is preferably less than 0.05 percent by mass and more preferably less than 0.045 percent by mass.

Nitrogen Content of Less Than 0.09 Percent by Mass

Nitrogen as well as carbon is an element useful in enhancing the hardness of the steel by hardening. In particular, nitrogen forms fine $Cr_2N$ precipitates at 500° C. to 700° C.; hence, the temper softening resistance is improved by the effect of hardening due to precipitation. Therefore, the use of nitrogen rather than carbon is effective in enhancing the temper softening resistance. In order to achieve such an advantage, the steel preferably contains 0.015 percent or more nitrogen on a mass basis. In order to further enhance the temper softening resistance, the nitrogen content is more than 0.03 percent by mass. On the other hand, an excessive increase in nitrogen content leads to a reduction in toughness; hence, the nitrogen content must be limited to less than 0.09 percent by mass. Silicon content of 1.0 percent by mass or less Since an excessive increase in silicon content leads to a reduction in toughness, the silicon content is limited to 1.0 percent by mass or less. The silicon content is preferably 0.3 percent by mass or less.

Manganese Content of 2.0 Percent by Mass or Less

Manganese bonds to sulfur to form MnS, which causes a reduction in corrosion resistance. Therefore, the manganese content is limited to 2.0 percent by mass or less. The manganese content is preferably less than 1.0 percent by mass and more preferably less than 0.5 percent by mass.

Phosphorus Content of 0.04 Percent by Mass or Less

Phosphorus is an element that causes a reduction in hot workability. Therefore, in view of production, it is preferable that the phosphorus content be minimized. However, since an excessive reduction in phosphorus content leads to an increase in steel making cost, the upper limit of the phosphorus content is 0.04 percent by mass. In view of hot workability, the phosphorus content is preferably 0.02 percent by mass or less.

Sulfur Content of 0.010 Percent by Mass or Less

Since an increase in sulfur content leads to a reduction in hot workability, the sulfur content as well as the phosphorus content is preferably low. In consideration of the desulfurization cost in steel making steps, the sulfur content is 0.010 percent by mass or less. In view of hot workability, the sulfur content is preferably 0.005 percent by mass or less.

Aluminum Content of 0.2 Percent by Mass or Less

Since an excessive increase in aluminum content leads to a reduction in toughness, the aluminum content is limited to 0.2 percent by mass or less. The aluminum content is preferably 0.20 percent by mass or less and more preferably 0.05 percent by mass or less.

Chromium Content of More Than 11.5 to 15.0 Percent by Mass

Chromium is an element essential to achieve corrosion resistance which is an advantage of the stainless steel. In order to achieve high corrosion resistance, it is necessary that the chromium content be more than 11.5 percent by mass. In order to achieve higher corrosion resistance, the chromium content is preferably 12.0 percent by mass or more. On the other hand, an increase in chromium content leads to a reduction in workability and a reduction in toughness. In particular, when the chromium content is more than 15.0 percent by mass, the stainless steel has seriously low toughness. Therefore, the upper limit of the chromium content is limited to 15.0 percent by mass. In order to achieve high toughness, the chromium content is preferably less than 14.0 percent by mass and more preferably less than 13.0 percent by mass.

Nickel Content of 0.5 to 2.0 Percent by Mass

Nickel inhibits chromium carbonitride from precipitating at high temperature more than 600° C. to maintain the hardness of martensitic structures supersaturatedly containing dissolved carbon, thereby enhancing the temper softening resistance. Furthermore, nickel is useful in enhancing the corrosion resistance which is an advantage of the stainless steel and also useful in enhancing the toughness. In order to achieve such advantages, it is necessary that the nickel content be 0.5 percent by mass or more. The nickel content is preferably more than 0.50 percent by mass and more preferably 0.55 percent by mass or more. Furthermore, in order to achieve high temper softening resistance, the nickel content is preferably more than 1.0 percent by mass. On the other hand, when the nickel content is more than 2.0 percent by mass, the increase in temper softening resistance is saturated and raw material cost is increased. Therefore, the nickel content is limited to 2.0 percent by mass or less.

Copper Content of More Than 0.50 to 4.0 Percent by Mass

Copper forms fine $\epsilon$-Cu precipitates at about 600° C. and the temper softening resistance is improved by the effect of the precipitates. In order to achieve such an advantage, the copper content is more than 0.50 percent by mass and preferably more than 0.5 percent by mass. In order to achieve high temper softening resistance, the copper content is preferably 1.0 percent by mass or more and more preferably 1.5 percent by mass or more. On the other hand, when the copper content is more than 4.0 percent by mass, the temper softening resistance is saturated and raw material cost is increased. Therefore, the copper content is limited to 4.0 percent by mass or less.

Niobium Content of More Than 0.08 to 0.6 Percent by Mass

Niobium strongly bonds to carbon or nitrogen to form niobium carbide precipitates or niobium nitride precipitates, respectively. These precipitates have no influence on the hardness of the hardened stainless steel but inhibit a strain introduced into martensitic structures by hardening from being relieved; thereby enhancing the temper softening resistance of the stainless steel maintained at about 600° C. In order to achieve such an advantage, it is necessary that the niobium content be more than 0.08 percent by mass. The niobium content is preferably 0.10 percent by mass or more. On the other hand, when the niobium content is more than 0.6 percent by mass, the temper softening resistance is saturated and the toughness is reduced; hence, the niobium content is limited to 0.6 percent by mass or less. In view of toughness, the niobium content is preferably 0.4 percent by mass or less and more preferably 0.2 percent by mass or less.

$$\text{Inequality } 0.03 \leq [C]+[N]-13/93 \times [Nb] \leq 0.09 \quad (1)$$

Carbon and nitrogen are elements essential to enhance the hardness of the steel by hardening. However, niobium carbide produced by the reaction between carbon and niobium and niobium nitride produced by the reaction between nitrogen and niobium are useless in increasing the hardness. Therefore, in order to control the hardness of the steel by hardening, the effects of carbon and nitrogen must be estimated using the middle term $[C]+[N]-13/93\times[Nb]$ of inequality (1), wherein the middle term represents the remainder obtained by subtracting the carbon and nitrogen content of the precipitates from that of the steel. When the middle term is less than 0.03, the hardness is less than 32 in HRC. In contrast, when the middle term is more than 0.09, the hardness is more than 38 in HRC. Therefore, in order to allow the hardened steel to have a hardness of 32 to 38 in HRC, which is suitable for disc brake uses, the middle term of inequality (1) is limited to 0.03 to 0.09.

$$\text{Inequality } 5\times[Cr]+10\times[Si]+30\times[Nb]-9\times[Ni]-5\times[Mn]-3\times[Cu]-225\times[N]-270\times[C] \leq 40 \quad (2)$$

Inequality (2) is useful in evaluating the hardenability. In order to allow a disc material to have high hardenability, it is necessary that 90 percent or more austenite be formed on a volume basis by heating the disc material at 900° C. to 1000° C. and transformed into martensite by air-cooling the heated disc material. In ordinary martensitic stainless steels, the amount of austenite is maximized at about 1000° C. and decreased at higher than or lower than 1000° C. When the left side of inequality (2) is more than 40, a temperature range in which 90 percent or more austenite is formed on a volume basis is small. Hence, the steel can hardly be sufficiently hardened, that is, the hardness of the steel is outside a proper hardness range if the hardening temperature is fluctuated in a manufacturing step. In view of productivity, the hardening temperature is preferably low because an increase in hardening temperature increases heating cost and heating time. From this view, it is critical that the steel hardened from 900° C. have a hardness of 32 or more in HRC. Therefore, in order to achieve high hardenability, it is necessary that the left side of inequality (2) be limited to 40 or less.

In the present invention, the steel preferably contains components below in addition to the above essential elements.

Vanadium Content of 0.02 to 0.3 Percent by Mass

Vanadium as well as niobium is an element useful in forming fine carbonitride precipitates to enhance the temper softening resistance. The vanadium content is preferably 0.02 percent by mass or more and more preferably 0.10 percent by mass or more. However, when the vanadium content is more than 0.3 percent by mass, the toughness is low. Therefore, the upper limit of the vanadium content is preferably 0.3 percent by mass.

One or Both of molybdenum Content of 0.02 to 2.0 Percent by Mass and cobalt Content of 0.02 to 2.0 Percent by Mass Molybdenum and cobalt are elements useful in enhance the corrosion resistance; hence, the steel may 0.02 percent or more molybdenum and/or 0.02 percent or more cobalt on a mass basis as needed. Molybdenum as well as nickel inhibits chromium carbonitride from precipitating to maintain the hardness of martensitic structures supersaturatedly containing carbon, thereby enhancing the temper softening resistance. In order to enhance the corrosion resistance, the steel preferably contains 0.5 percent or more of each element on a mass basis. When the molybdenum content and the cobalt content are 1.5 percent by mass or less respectively, the steel has sufficiently high corrosion resistance. In contrast, when the molybdenum content and the cobalt content are more than 2.0 percent by mass respectively, the effect of improving the corrosion resistance is saturated and the toughness is decreased. Therefore, the upper limit of the molybdenum content and that of the cobalt content are preferably 2.0 percent by mass respectively.

One or More of titanium Content of 0.02 to 0.3 Percent by Mass, zirconium Content of 0.02 to 0.3 Percent by Mass, and tantalum Content of 0.02 to 0.3 Percent by Mass Titanium, zirconium, and tantalum as well as niobium are elements useful in creating fine carbonitride precipitates to enhance the temper softening resistance. The steel may contain 0.02 percent or more of each element on a mass basis as needed. However, when the content of the element is more than 0.3 percent by mass, the toughness is low. Therefore, the upper limit of the content of the element is preferably 0.3 percent by mass.

One or Both of boron Content of 0.0005 to 0.0050 Percent by Mass and calcium Content of 0.0005 to 0.0050 Percent by Mass Boron and calcium are useful in enhancing the toughness of the steel if the boron or calcium content is small. Hence, the steel preferably contains 0.0005 percent or more boron and/or 0.0005 percent or more calcium on a mass basis. However, when the boron or calcium content is more than 0.0050 percent by mass respectively, the effect is saturated and the corrosion resistance is decreased. Therefore, the upper limit of the boron or calcium content is preferably 0.0050 percent by mass respectively.

The martensitic stainless steel of the present invention contains iron and avoidable impurities in addition to the above components. Examples of the impurities (0.01 percent or less by mass) include alkali metals, alkaline-earth metals, rare-earth element, and transition metals, for example, sodium, barium, lanthanum, yttrium, and hafnium. The impurities do not reduce the advantages of the present invention.

The structure of a sheet made of the martensitic stainless steel for disc brakes according to the present invention will now be described.

In the steel of the present invention, in order to achieve sufficiently high hardenability, it is necessary that 90 percent or more austenite be formed on a volume basis by heating the steel at 900° C. to 1000° C. and transformed into martensite by air-cooling the heated steel. Therefore, the steel preferably contains 90 percent or more martensite on a volume basis, the remainder being ferrite. When the volume of martensite is less than 90%, the volume of ferrite, which is soft, is large; hence, desired hardness can hardly be achieved.

A method for manufacturing the martensitic stainless steel according to the present invention will now be described.

The method for manufacturing the steel is not particularly limited and any known method for manufacturing an ordinary martensitic stainless steel may be used.

The method preferably includes a step of preparing molten steel containing the above essential components and additional components used as needed in a converter or an electric furnace and a step of subjecting the molten steel to secondary smelting by a smelting process such as a vacuum degassing process (an RH process), VOD (vacuum oxygen decarburization), or AOD (argon oxygen decarburization). The molten steel may be formed into a steel material (a slab) by a known process such as a continuous casting process or a slabbing process. In view of productivity and quality, the continuous casting process is preferably used. The obtained steel material is heated at 1100° C. to 1250° C., hot-rolled at a finishing temperature of 800° C. to 1100° C., and then coiled at 600° C. to 900° C., whereby a hot-rolled steel strip with a thickness of 3 to 8 mm is prepared. The hot-rolled steel strip is annealed at 650° C. to 900° C. for four to 20 hours in a batch-type furnace such as a box annealing furnace and then rolled into a sheet as needed, whereby a disc material is prepared. The hot-rolled steel strip may be descaled by pickling or shot blast.

The disc material obtained as described above is stamped into pieces having a disc shape. Each piece is heated at 900° C. to 1000° C., hardened by an air-cooling process or another process by which the piece can be cooled at a cooling rate of air-cooling or higher, and then subjected to descaling and/or coating as needed. Friction faces of the resulting piece that are rubbed with brake pads are mechanically polished such that the piece is improved in beauty and thickness accuracy, whereby a disc product having a configuration shown in FIG. 1 is obtained.

The martensitic stainless steel, manufactured as described above, according to the present invention can be used to manufacture brake discs for motorcycles, bicycles, motorcars, and snow mobiles. Since discs for bicycle disc brakes have a thickness of about 2 mm, the hot-rolled steel strip annealed and then pickled is cold-rolled with a tandem mill or a reverse mill such as a Sendzimir mill, annealed at 600° C. to 900° C. as needed, and then pickled as needed, whereby a material for such discs is prepared. This disc material can be processed into products by the same procedure as that for manufacturing the former product using the hot-rolled steel strip.

EXAMPLE 1

Steel samples (Nos. 1 to 67) containing chemical components shown in Tables 1 to 4 were prepared in a small-sized vacuum melting furnace. Each steel sample was cast into an ingot with a weight of 50 kgf. The ingot was hot-rolled into a sheet with a thickness of 5 mm at a finishing temperature of 900° C. The hot-rolled sheet was annealed at 700° C. for eight hours in an argon atmosphere, gradually cooled, and then pickled in such a manner that the sheet was immersed in an acid mixture (an aqueous solution containing 10 mass % nitric acid and 3 mass % hydrofluoric acid) maintained at 60° C. such that scale on the sheet is removed, whereby a test specimen investigated as described below was prepared.
(Hardenability)

Two test pieces were prepared by cutting each test specimen. The test pieces were 30 mm square and had a thickness equal to the sheet thickness. One of the pieces was heated at 900° C. for ten minutes and the other one was heated at 1000° C. for ten minutes. The resulting pieces were hardened by air-cooling. Scale was removed from surfaces of the pieces by pickling. The surface hardness in HRC (JIS Z 2245) was measured at five points per test piece and obtained measurements were averaged. It is necessary for steel for discs to have a hardness of 32 to 38 in HRC after the steel is hardened at 900° C. or 1000° C. as described above. Hence, if one of the test pieces hardened at the above temperature has a hardness outside the above range, the test specimen can be evaluated to be inferior in stability of hardenability; that is, there is a possibility that the test specimen has an insufficient hardness due to fluctuations in heat-treating temperature.
(Temper Softening Resistance)

Other two test pieces were prepared by cutting each test specimen. These test pieces were 30 mm square and had a thickness equal to the sheet thickness. The test pieces were heated at 1000° C. for ten minutes and then hardened by air-cooling. One of the test pieces was tempered at 650° C. for one hour and the other one was tempered at 670° C. for one hour. Scale was removed from surfaces of the pieces by pickling. The surface hardness (HRC) was measured at five points per test piece and obtained measurements were averaged, whereby the temper softening resistance of the test pieces tempered at 650° C. and 670° C. was evaluated. If the test piece tempered at 650° C. has a hardness of 32 or more in HRC and the test piece tempered at 670° C. has a hardness of 30 or more in HRC, the test specimen can be evaluated to have sufficiently high temper softening resistance.
(Corrosion Resistance)

A corrosion resistance test was performed as follows: each test specimen was heated at 1000° C. for ten minutes, hardened by air-cooling, and then tempered at 650° C. for one hour; a test piece having a width of 70 mm, a length of 150 mm, and a thickness equal to the sheet thickness was prepared by cutting the resulting test specimen; a test face (a test face of the test piece) was wet-polished with a sheet of #800 emery polishing paper; the resulting test piece was subjected to a salt spray test for eight hours according to JIS Z 2371; and the number of rust spots was counted. The corrosion resistance was evaluated as follows: a rating of ○ was given to the test pieces having no rust spot, a rating of Δ was given to the test pieces having one to four rust spots, and a rating of × was given to the test pieces having five or more rust spots. The test pieces having five or more rust spots can be evaluated to be inferior in corrosion resistance and are not therefore suitable for practical use.
(Toughness)

The toughness was measured as follows: each test specimen was heated at 1000° C. for ten minutes, hardened by air-cooling, and then tempered at 650° C. for one hour; three subsize Charpy impact test pieces (a thickness of 10 mm, a width of 5 mm (equal to the thickness of the hot-rolled sheet), and a length of 55 mm) were prepared by cutting the resulting test specimen according to JIS Z 2202; the Charpy impact value of the test pieces was measured by performing the Charpy impact test at 25° C. (JIS Z 2242); and obtained measurements were then averaged. If the test specimen has an average Charpy impact value of 50 J/cm$^2$ or more, the specimen can be evaluated to be suitable for practical use.

Tables 1 to 4 show the results of the above tests. The steel samples (Nos. 1 to 49) shown in Tables 1, 2, and 3 comply with the standards of the present invention. For the steel samples, the test pieces hardened from 900° C. and 1000° C. have a proper hardness, that is, a hardness of 32 to 38 in HRC. The test pieces hardened from 1000° C. and then tempered at 650° C. have a hardness of 32 or more in HRC. The test pieces hardened from 1000° C. and then tempered at 670° C. have a hardness of 30 or more in HRC. The test pieces subjected to the impact test have a Charpy impact value of 50 J/cm² or more. The test pieces subjected to the salt spray test have high corrosion resistance. In contrast, the steel samples (Nos. 50 to 67) shown in Tables 4 do not comply with the standards of the present invention. For these steel samples, the test pieces have low hardness, low Charpy impact value, and/or low corrosion resistance after they have been hardened from 900° C. or 1000° C. or tempered at 650° C. or 670° C. As is clear from the above results, the hot-rolled sheets prepared using the steel samples having the same composition as that of the martensitic stainless steel of the present invention have satisfactory properties and are suitable for disc brakes.

EXAMPLE 2

Properties of a cold-rolled steel sheet were investigated. An annealed cold-rolled sheet was obtained by the following procedure: the test specimen prepared by processing the annealed hot-rolled sheet, prepared using Steel Sample 1 shown in Table 1 of Example 1, having a thickness of 5 mm was cold-rolled, whereby a cold-rolled sheet with a thickness of 1.5 mm was prepared; the cold-rolled sheet was annealed in such a manner that the sheet was heated at 750° C. for one minute and then air-cooled; the resulting cold-rolled sheet was descaled in such a manner that the sheet was immersed in an acid mixture (10% nitric acid and 3% hydrofluoric acid on a mass basis) maintained at 60° C. The annealed cold-rolled sheet was tested in the same manner as that described in Example 1. A subsize Charpy impact test piece had a width of 1.5 mm (the thickness of the cold-rolled sheet). Results obtained by testing the cold-rolled sheet were as follows: test pieces hardened from 900° C. had a hardness of 37 in HRC, test pieces hardened from 1000° C. had a hardness of 37 in HRC, test pieces hardened from 1000° C. and then tempered at 650° C. had a hardness of 34 in HRC, and test pieces hardened from 1000° C. and then tempered at 670° C. had a hardness of 32 in HRC. The subsize Charpy impact test piece had a Charpy impact value of 85 J/cm². Test pieces subjected to the salt spray test had no rust spot; that is, these test pieces had high corrosion resistance. As is clear from these results, the cold-rolled steel sheet prepared using the steel sample having the same composition as that of the martensitic stainless steel of the present invention has satisfactory properties and are suitable for disc brakes.

Industrial Applicability

As described above, according to the present invention, a martensitic stainless steel, having high temper softening resistance, for disc brakes can be manufactured by properly controlling the composition thereof. In particular, the martensitic stainless steel is not seriously softened by maintaining the steel at more than 600° C. The steel has a hardness of 32 or more or a hardness of 30 or more in HRC after the steel is tempered at 650° C. for one hour or tempered at 670° C. for one hour, respectively.

TABLE 1

| Steel Samples | Composition (percent by mass) | | | | | | | | | | | | Value of Middle Term of Inequality (1) |
|---|---|---|---|---|---|---|---|---|---|---|---|---|---|
| | C | Si | Mn | P | S | Al | Cr | Ni | Cu | Nb | N | Other Elements | |
| 1 | 0.041 | 0.24 | 0.33 | 0.01 | 0.004 | 0.012 | 12.2 | 1.21 | 1.65 | 0.17 | 0.057 | — | 0.074 |
| 2 | 0.048 | 0.23 | 0.18 | 0.02 | 0.003 | 0.003 | 12.7 | 1.18 | 1.62 | 0.21 | 0.042 | — | 0.061 |
| 3 | 0.042 | 0.23 | 0.32 | 0.02 | 0.003 | 0.013 | 12.2 | 1.20 | 0.58 | 0.18 | 0.053 | — | 0.070 |
| 4 | 0.044 | 0.22 | 0.44 | 0.03 | 0.001 | 0.003 | 12.5 | 1.32 | 1.14 | 0.18 | 0.043 | — | 0.062 |
| 5 | 0.018 | 0.86 | 0.38 | 0.02 | 0.004 | 0.013 | 12.3 | 1.58 | 1.58 | 0.18 | 0.053 | — | 0.046 |
| 6 | 0.043 | 0.24 | 0.43 | 0.02 | 0.003 | 0.003 | 12.9 | 1.77 | 1.61 | 0.09 | 0.055 | — | 0.085 |
| 7 | 0.011 | 0.21 | 0.34 | 0.02 | 0.003 | 0.002 | 12.4 | 1.12 | 1.92 | 0.19 | 0.085 | — | 0.069 |
| 8 | 0.043 | 0.18 | 0.78 | 0.02 | 0.005 | 0.003 | 12.7 | 1.68 | 1.62 | 0.15 | 0.045 | Ti: 0.15 | 0.067 |
| 9 | 0.043 | 0.17 | 0.35 | 0.01 | 0.002 | 0.008 | 14.4 | 1.58 | 1.75 | 0.38 | 0.071 | — | 0.061 |
| 10 | 0.041 | 0.19 | 1.75 | 0.02 | 0.003 | 0.003 | 12.3 | 1.57 | 1.60 | 0.18 | 0.036 | — | 0.052 |
| 11 | 0.033 | 0.12 | 0.42 | 0.02 | 0.004 | 0.015 | 11.8 | 1.51 | 3.65 | 0.23 | 0.046 | — | 0.047 |
| 12 | 0.042 | 0.21 | 0.42 | 0.02 | 0.003 | 0.003 | 12.3 | 0.57 | 2.04 | 0.16 | 0.043 | — | 0.063 |
| 13 | 0.037 | 0.29 | 0.41 | 0.02 | 0.004 | 0.013 | 12.5 | 1.17 | 1.85 | 0.55 | 0.082 | — | 0.042 |
| 14 | 0.042 | 0.22 | 0.42 | 0.01 | 0.003 | 0.005 | 12.3 | 1.07 | 2.05 | 0.19 | 0.024 | — | 0.039 |
| 15 | 0.042 | 0.23 | 0.25 | 0.02 | 0.003 | 0.018 | 12.3 | 1.88 | 1.50 | 0.33 | 0.063 | Mo: 0.85 | 0.059 |
| 16 | 0.033 | 0.15 | 1.55 | 0.02 | 0.003 | 0.003 | 12.3 | 0.47 | 1.08 | 0.15 | 0.045 | — | 0.06 |
| 17 | 0.037 | 0.23 | 0.45 | 0.02 | 0.004 | 0.016 | 12.8 | 1.94 | 1.55 | 0.25 | 0.035 | Mo: 1.43 | 0.037 |
| 18 | 0.039 | 0.22 | 0.33 | 0.02 | 0.003 | 0.023 | 12.9 | 1.17 | 1.62 | 0.15 | 0.048 | Mo: 1.05 | 0.066 |
| 19 | 0.044 | 0.21 | 0.25 | 0.02 | 0.003 | 0.017 | 12.2 | 1.10 | 2.12 | 0.23 | 0.054 | Mo: 0.12 | 0.066 |
| 20 | 0.043 | 0.15 | 0.18 | 0.02 | 0.003 | 0.022 | 12.1 | 1.13 | 2.07 | 0.39 | 0.052 | Mo: 1.75 | 0.040 |
| 21 | 0.039 | 0.23 | 0.35 | 0.02 | 0.003 | 0.002 | 12.2 | 1.22 | 1.61 | 0.17 | 0.055 | V: 0.05 | 0.070 |
| 22 | 0.041 | 0.23 | 0.33 | 0.02 | 0.002 | 0.002 | 12.3 | 1.22 | 0.59 | 0.18 | 0.053 | V: 0.13 | 0.069 |
| 23 | 0.042 | 0.23 | 0.34 | 0.02 | 0.003 | 0.003 | 12.8 | 1.47 | 1.14 | 0.09 | 0.044 | V: 0.12 | 0.073 |
| 24 | 0.040 | 0.18 | 1.55 | 0.02 | 0.002 | 0.003 | 12.2 | 0.51 | 1.11 | 0.18 | 0.035 | V: 0.13 | 0.050 |
| 25 | 0.041 | 0.23 | 0.35 | 0.02 | 0.002 | 0.003 | 12.4 | 0.46 | 2.54 | 0.16 | 0.044 | V: 0.19 | 0.063 |
| 26 | 0.035 | 0.30 | 0.45 | 0.03 | 0.004 | 0.003 | 12.4 | 1.15 | 1.55 | 0.55 | 0.085 | V: 0.30 | 0.043 |

| Steel Samples | Value of Left Side of Inequality (2) | Hardness of Hardened Test Pieces (HRC) | | Hardness of Test Pieces | Hardness of Test Pieces | Salt Spray Test | Charpy Impact Value (J/cm²) | Remarks |
|---|---|---|---|---|---|---|---|---|
| | | Quenching Temperature at 900° C. | Quenching Temperature at 1000° C. | Tempered at 650° C. (HRC) | Tempered at 670° C. (HRC) | | | |
| 1 | 27 | 37 | 37 | 35 | 32 | ◯ | 78 | Example |
| 2 | 33 | 34 | 35 | 33 | 31 | Δ | 58 | Example |
| 3 | 31 | 35 | 36 | 32 | 30 | ◯ | 68 | Example |

TABLE 1-continued

| | | | | | | | | | |
|---|---|---|---|---|---|---|---|---|---|
| 4 | 31 | 35 | 35 | 33 | 30 | ○ | 73 | Example |
| 5 | 38 | 33 | 34 | 32 | 30 | ○ | 56 | Example |
| 6 | 23 | 37 | 37 | 32 | 30 | ○ | 74 | Example |
| 7 | 30 | 34 | 35 | 33 | 31 | ○ | 73 | Example |
| 8 | 24 | 34 | 35 | 33 | 31 | Δ | 68 | Example |
| 9 | 36 | 33 | 35 | 32 | 30 | ○ | 52 | Example |
| 10 | 22 | 34 | 35 | 33 | 30 | Δ | 83 | Example |
| 11 | 21 | 33 | 33 | 32 | 30 | Δ | 72 | Example |
| 12 | 34 | 35 | 35 | 32 | 30 | ○ | 79 | Example |
| 13 | 35 | 33 | 34 | 32 | 30 | ○ | 52 | Example |
| 14 | 35 | 33 | 34 | 32 | 30 | ○ | 86 | Example |
| 15 | 26 | 34 | 34 | 33 | 31 | ○ | 73 | Example |
| 16 | 33 | 35 | 35 | 32 | 30 | ○ | 70 | Example |
| 17 | 32 | 33 | 33 | 32 | 30 | ○ | 74 | Example |
| 18 | 33 | 33 | 35 | 32 | 30 | ○ | 75 | Example |
| 19 | 28 | 34 | 34 | 33 | 31 | ○ | 75 | Example |
| 20 | 33 | 33 | 33 | 32 | 30 | ○ | 81 | Example |
| 21 | 28 | 36 | 36 | 34 | 32 | ○ | 80 | Example |
| 22 | 32 | 35 | 36 | 32 | 30 | ○ | 70 | Example |
| 23 | 29 | 36 | 36 | 32 | 30 | ○ | 75 | Example |
| 24 | 34 | 35 | 35 | 33 | 31 | Δ | 65 | Example |
| 25 | 35 | 34 | 34 | 32 | 30 | ○ | 53 | Example |
| 26 | 38 | 33 | 34 | 32 | 30 | ○ | 52 | Example |

TABLE 2

| Steel Samples | Composition (percent by mass) | | | | | | | | | | | | Value of Middle Term of Inequality (1) |
|---|---|---|---|---|---|---|---|---|---|---|---|---|---|
| | C | Si | Mn | P | S | Al | Cr | Ni | Cu | Nb | N | Other Elements | |
| 27 | 0.042 | 0.28 | 0.12 | 0.02 | 0.003 | 0.003 | 11.8 | 1.12 | 1.73 | 0.22 | 0.066 | V: 0.12, B: 0.0015 | 0.077 |
| 28 | 0.048 | 0.25 | 0.18 | 0.02 | 0.003 | 0.003 | 12.8 | 1.15 | 1.62 | 0.23 | 0.042 | — | 0.058 |
| 29 | 0.043 | 0.23 | 0.34 | 0.02 | 0.003 | 0.023 | 12.1 | 1.20 | 1.11 | 0.18 | 0.054 | Co: 0.12, B: 0.0009 | 0.072 |
| 30 | 0.044 | 0.31 | 0.44 | 0.03 | 0.001 | 0.003 | 12.5 | 0.52 | 1.04 | 0.15 | 0.043 | Co: 0.30 | 0.066 |
| 31 | 0.038 | 0.16 | 0.28 | 0.02 | 0.004 | 0.003 | 12.2 | 0.58 | 1.68 | 0.18 | 0.043 | Ca: 0.0011 | 0.056 |
| 32 | 0.043 | 0.21 | 0.43 | 0.02 | 0.003 | 0.003 | 12.9 | 1.87 | 1.61 | 0.09 | 0.055 | Co: 1.2, Ca: 0.0006 | 0.085 |
| 33 | 0.012 | 0.21 | 0.33 | 0.02 | 0.003 | 0.012 | 12.5 | 1.12 | 1.82 | 0.19 | 0.084 | Mo: 0.8, V: 0.05 | 0.069 |
| 34 | 0.043 | 0.15 | 0.28 | 0.02 | 0.005 | 0.003 | 12.7 | 1.66 | 1.62 | 0.16 | 0.015 | B: 0.0045 | 0.036 |
| 35 | 0.042 | 0.17 | 0.34 | 0.01 | 0.002 | 0.003 | 12.8 | 1.08 | 1.64 | 0.58 | 0.071 | Mo: 0.7, V: 0.08 | 0.032 |
| 36 | 0.041 | 0.09 | 1.55 | 0.02 | 0.003 | 0.003 | 12.3 | 0.54 | 1.10 | 0.15 | 0.041 | Ca: 0.0046 | 0.061 |
| 37 | 0.036 | 0.12 | 0.43 | 0.02 | 0.002 | 0.003 | 12.1 | 1.51 | 1.65 | 0.23 | 0.046 | Co: 0.8, Ta: 0.08 | 0.050 |
| 38 | 0.042 | 0.29 | 0.42 | 0.02 | 0.003 | 0.003 | 12.2 | 1.07 | 2.04 | 0.16 | 0.042 | Mo: 1.5, V: 0.12 | 0.062 |
| 39 | 0.018 | 0.29 | 0.43 | 0.02 | 0.004 | 0.003 | 12.5 | 0.97 | 1.95 | 0.15 | 0.082 | Co: 0.03, B: 0.0019 | 0.079 |

| Steel Samples | Value of Left Side of Inequality (2) | Hardness of Hardened Test Pieces (HRC) | | Hardness of Test Pieces Tempered at 650° C. (HRC) | Hardness of Test Pieces Tempered at 670° C. (HRC) | Salt Spray Test | Charpy Impact Value (J/cm$^2$) | Remarks |
|---|---|---|---|---|---|---|---|---|
| | | Quenching Temperature at 900° C. | Quenching Temperature at 1000° C. | | | | | |
| 27 | 26 | 37 | 37 | 34 | 32 | Δ | 68 | Example |
| 28 | 35 | 33 | 35 | 33 | 30 | Δ | 55 | Example |
| 29 | 29 | 35 | 36 | 33 | 31 | ○ | 67 | Example |
| 30 | 39 | 33 | 35 | 33 | 30 | ○ | 53 | Example |
| 31 | 36 | 33 | 35 | 33 | 31 | ○ | 66 | Example |
| 32 | 22 | 37 | 37 | 33 | 30 | ○ | 74 | Example |
| 33 | 31 | 34 | 35 | 34 | 32 | ○ | 63 | Example |
| 34 | 34 | 33 | 34 | 33 | 30 | ○ | 68 | Example |
| 35 | 39 | 32 | 34 | 34 | 32 | ○ | 54 | Example |
| 36 | 31 | 34 | 35 | 32 | 30 | Δ | 64 | Example |
| 37 | 28 | 35 | 35 | 34 | 31 | ○ | 62 | Example |
| 38 | 30 | 35 | 35 | 34 | 32 | ○ | 69 | Example |
| 39 | 30 | 37 | 37 | 32 | 30 | ○ | 72 | Example |

TABLE 3

| Steel Samples | Composition (percent by mass) | | | | | | | | | | | | Value of Middle Term of Inequality (1) |
|---|---|---|---|---|---|---|---|---|---|---|---|---|---|
| | C | Si | Mn | P | S | Al | Cr | Ni | Cu | Nb | N | Other Elements | |
| 40 | 0.042 | 0.25 | 0.42 | 0.02 | 0.003 | 0.005 | 12.4 | 1.07 | 2.05 | 0.16 | 0.044 | Mo: 1.1, V: 0.28 | 0.064 |
| 41 | 0.041 | 0.94 | 0.15 | 0.02 | 0.003 | 0.003 | 12.3 | 1.88 | 1.60 | 0.33 | 0.063 | Mo: 0.2, Ti: 0.05 | 0.058 |
| 42 | 0.036 | 0.12 | 0.12 | 0.02 | 0.002 | 0.003 | 12.1 | 1.12 | 1.88 | 0.25 | 0.048 | Mo: 1.9, V: 0.04 | 0.049 |
| 43 | 0.036 | 0.23 | 0.33 | 0.04 | 0.008 | 0.003 | 12.8 | 1.94 | 1.52 | 0.25 | 0.038 | Mo: 0.7, Zr: 0.14 | 0.039 |
| 44 | 0.039 | 0.23 | 1.87 | 0.02 | 0.003 | 0.023 | 12.9 | 1.11 | 1.62 | 0.26 | 0.045 | V: 0.2, Ca: 0.0012 | 0.048 |
| 45 | 0.043 | 0.21 | 0.28 | 0.01 | 0.003 | 0.003 | 12.2 | 1.10 | 2.03 | 0.47 | 0.054 | V: 0.11 | 0.031 |
| 46 | 0.043 | 0.12 | 0.18 | 0.02 | 0.002 | 0.152 | 12.1 | 1.12 | 2.07 | 0.48 | 0.056 | Mo: 1.3, V: 0.03 | 0.032 |
| 47 | 0.041 | 0.26 | 0.65 | 0.02 | 0.003 | 0.022 | 12.3 | 1.06 | 1.85 | 0.22 | 0.047 | V: 0.14, B: 0.0012 | 0.057 |
| 48 | 0.043 | 0.12 | 0.31 | 0.02 | 0.002 | 0.003 | 12.1 | 1.71 | 0.58 | 0.25 | 0.058 | Co: 0.08, Ca: 0.0036 | 0.066 |
| 49 | 0.044 | 0.30 | 0.05 | 0.03 | 0.005 | 0.003 | 14.3 | 1.1 | 2.05 | 0.15 | 0.055 | Mo: 0.7, V: 0.13 | 0.078 |

| Steel Samples | Value of Left Side of Inequality (2) | Hardness of Hardened Test Pieces (HRC) | | Hardness of Test Pieces Tempered at 650° C. (HRC) | Hardness of Test Pieces Tempered at 670° C. (HRC) | Salt Spray Test | Charpy Impact Value (J/cm²) | Remarks |
|---|---|---|---|---|---|---|---|---|
| | | Quenching Temperature at 900° C. | Quenching Temperature at 1000° C. | | | | | |
| 40 | 30 | 35 | 35 | 34 | 32 | ○ | 63 | Example |
| 41 | 33 | 34 | 35 | 34 | 32 | ○ | 53 | Example |
| 42 | 32 | 35 | 35 | 34 | 32 | ○ | 74 | Example |
| 43 | 32 | 33 | 34 | 34 | 32 | ○ | 69 | Example |
| 44 | 30 | 33 | 34 | 34 | 32 | Δ | 71 | Example |
| 45 | 36 | 32 | 34 | 34 | 32 | ○ | 50 | Example |
| 46 | 35 | 32 | 34 | 34 | 32 | ○ | 53 | Example |
| 47 | 31 | 34 | 35 | 34 | 32 | Δ | 72 | Example |
| 48 | 26 | 35 | 35 | 32 | 30 | ○ | 68 | Example |
| 49 | 38 | 35 | 37 | 34 | 32 | ○ | 55 | Example |

TABLE 4

| Steel Samples | Composition (percent by mass) | | | | | | | | | | | | Value of Middle Term of Inequality (1) |
|---|---|---|---|---|---|---|---|---|---|---|---|---|---|
| | C | Si | Mn | P | S | Al | Cr | Ni | Cu | Nb | N | Other Elements | |
| 50 | 0.051 | 0.14 | 0.12 | 0.02 | 0.003 | 0.003 | 12.2 | 1.05 | 2.03 | 0.15 | 0.043 | — | 0.073 |
| 51 | 0.033 | 1.12 | 0.16 | 0.02 | 0.002 | 0.005 | 12.3 | 1.68 | 1.88 | 0.30 | 0.065 | Mo: 0.7, Zr: 0.12 | 0.056 |
| 52 | 0.043 | 0.21 | 2.12 | 0.02 | 0.003 | 0.006 | 12.1 | 1.22 | 1.80 | 0.43 | 0.064 | Ti: 0.25 | 0.047 |
| 53 | 0.049 | 0.13 | 1.78 | 0.03 | 0.008 | 0.005 | 12.2 | 0.10 | 1.23 | 0.26 | 0.018 | — | 0.031 |
| 54 | 0.080 | 0.02 | 0.25 | 0.02 | 0.005 | 0.031 | 12.2 | 0.85 | 0.35 | 0.04 | 0.011 | — | 0.085 |
| 55 | 0.050 | 0.25 | 2.12 | 0.02 | 0.003 | 0.001 | 12.5 | 0.86 | 0.01 | 0.25 | 0.030 | — | 0.045 |
| 56 | 0.046 | 0.32 | 1.52 | 0.02 | 0.002 | 0.007 | 12.3 | 0.27 | 0.01 | 0.13 | 0.037 | — | 0.065 |
| 57 | 0.040 | 0.12 | 0.31 | 0.03 | 0.002 | 0.022 | 11.2 | 1.43 | 1.88 | 0.23 | 0.055 | Ta: 0.12 | 0.063 |
| 58 | 0.043 | 0.23 | 0.44 | 0.02 | 0.002 | 0.009 | 12.2 | 0.44 | 3.21 | 0.25 | 0.055 | — | 0.063 |
| 59 | 0.043 | 0.29 | 0.43 | 0.03 | 0.003 | 0.009 | 12.4 | 1.06 | 1.89 | 0.62 | 0.084 | V: 0.06 | 0.040 |
| 60 | 0.043 | 0.19 | 0.34 | 0.01 | 0.003 | 0.005 | 12.5 | 1.72 | 0.41 | 0.19 | 0.059 | Co: 0.08, Ca: 0.0023 | 0.075 |
| 61 | 0.008 | 0.16 | 0.21 | 0.02 | 0.002 | 0.006 | 13.3 | 1.14 | 1.63 | 0.00 | 0.092 | — | 0.100 |
| 62 | 0.023 | 0.14 | 0.19 | 0.02 | 0.005 | 0.221 | 12.2 | 1.65 | 2.23 | 0.16 | 0.076 | — | 0.077 |
| 63 | 0.043 | 0.12 | 0.34 | 0.02 | 0.002 | 0.012 | 12.1 | 1.18 | 1.56 | 0.08 | 0.035 | — | 0.067 |
| 64 | 0.033 | 0.23 | 0.34 | 0.01 | 0.003 | 0.003 | 12.1 | 1.46 | 1.66 | 0.34 | 0.043 | B: 0.0025 | 0.028 |
| 65 | 0.038 | 0.13 | 0.08 | 0.03 | 0.002 | 0.013 | 12.8 | 1.08 | 1.58 | 0.16 | 0.077 | Mo: 1.3, V: 0.03 | 0.093 |
| 66 | 0.033 | 0.24 | 0.12 | 0.02 | 0.003 | 0.005 | 12.8 | 1.13 | 1.54 | 0.31 | 0.044 | Mo: 1.9, V: 0.04 | 0.034 |
| 67 | 0.039 | 0.22 | 0.33 | 0.02 | 0.002 | 0.033 | 15.4 | 1.93 | 1.51 | 0.20 | 0.058 | — | 0.069 |

TABLE 4-continued

| Steel Samples | Value of Left Side of Inequality (2) | Hardness of Hardened Test Pieces (HRC) | | Hardness of Test Pieces Tempered at 650° C. (HRC) | Hardness of Test Pieces Tempered at 670° C. (HRC) | Salt Spray Test | Charpy Impact Value (J/cm²) | Remarks |
|---|---|---|---|---|---|---|---|---|
| | | Quenching Temperature at 900° C. | Quenching Temperature at 1000° C. | | | | | |
| 50 | 27 | 35 | 35 | 33 | 31 | X | 15 | Comparative Example |
| 51 | 37 | 32 | 35 | 33 | 31 | ○ | 23 | Comparative Example |
| 52 | 23 | 34 | 34 | 32 | 30 | X | 65 | Comparative Example |
| 53 | 39 | 32 | 33 | 24 | 21 | X | 16 | Comparative Example |
| 54 | 28 | 37 | 37 | 22 | 19 | X | 14 | Comparative Example |
| 55 | 34 | 32 | 34 | 24 | 21 | X | 22 | Comparative Example |
| 56 | 38 | 33 | 35 | 21 | 18 | X | 19 | Comparative Example |
| 57 | 21 | 35 | 35 | 33 | 31 | X | 65 | Comparative Example |
| 58 | 31 | 34 | 35 | 28 | 25 | X | 29 | Comparative Example |
| 59 | 36 | 32 | 34 | 32 | 30 | ○ | 23 | Comparative Example |
| 60 | 27 | 36 | 36 | 26 | 23 | ○ | 69 | Comparative Example |
| 61 | 29 | 39 | 40 | 20 | 16 | ○ | 18 | Comparative Example |
| 62 | 21 | 36 | 36 | 33 | 31 | ○ | 16 | Comparative Example |
| 63 | 28 | 35 | 35 | 23 | 20 | ○ | 69 | Comparative Example |
| 64 | 35 | 28 | 29 | 25 | 22 | ○ | 65 | Comparative Example |
| 65 | 28 | 39 | 40 | 38 | 35 | ○ | 64 | Comparative Example |
| 66 | 42 | 30 | 33 | 32 | 30 | ○ | 69 | Comparative Example |
| 67 | 38 | 33 | 36 | 32 | 30 | ○ | 25 | Comparative Example |

Note:
Underlined values are outside the scope of the present invention

The invention claimed is:

1. A hot-rolled and stamped sheet made of a martensitic stainless steel, the steel comprising:

less than 0.050 mass % carbon, 1.0 mass % or less silicon, 2.0 mass % or less manganese, 0.04 mass % or less phosphorus, 0.010 mass % or less sulfur, 0.2 mass % or less aluminum, chromium in a range of from more than 11.5 mass % to 15.0 mass %, nickel in a range of from 0.5 mass % to 2.0 mass %, copper in a range of from more than 0.50 mass % to 4.0 mass %, niobium in a range of from 0.15 mass % to 0.6 mass %, less than 0.09 mass % nitrogen, 0.0005 mass % to 0.0050 mass % calcium, and iron and unavoidable impurities, wherein the carbon content, the nitrogen content, the niobium content, the chromium content, the silicon content, the nickel content, the manganese content, and the copper content satisfy the following relationships (1) and (2):

$$0.03 \leq [C]+[N]-13/93 \times [Nb] \leq 0.09 \quad (1)$$

$$5 \times [Cr]+10 \times [Si]+30 \times [Nb]-9 \times [Ni]-5 \times [Mn]-3 \times [Cu]-225 \times [N]-270 \times [C] \leq 40 \quad (2),$$

the steel sheet being 90 percent to 100 percent martensite on a volume basis, and the remainder of the volume of the steel being ferrite, the martensite and the ferrite being formed by subjecting the steel to heating at 900° C. to 1000° C. and hardening by cooling at a cooling rate of air-cooling or higher, the steel sheet having a hardness of 32 to 38 in HRC, a hardness of 32 or more in HRC when the steel is further tempered at 650° C. for one hour, a hardness of 30 or more in HRC when the steel is further tempered at 670° C. for one hour, a Charpy impact value of 50 J/cm² or more, and high corrosion resistance, wherein the steel sheet is in a shape of a disc brake.

2. A cold-rolled and stamped sheet made of a martensitic stainless steel, the steel comprising:

less than 0.050 mass % carbon, 1.0 mass % or less silicon, 2.0 mass % or less manganese, 0.04 mass % or less phosphorus, 0.010 mass % or less sulfur, 0.2 mass % or less aluminum, chromium in a range of from more than 11.5 mass % to 15.0 mass %, nickel in a range of from more than 0.5 mass % to 2.0 mass %, copper in a range of from more than 0.50 mass % to 4.0 mass %, niobium in a range of from 0.15 mass % to 0.6 mass %, less than 0.09 mass % nitrogen, 0.0005 mass % to 0.0050 mass % calcium, and iron and unavoidable impurities, wherein the carbon content, the nitrogen content, the niobium content, the chromium content, the silicon content, the nickel content, the manganese content, and the copper content satisfy the following relationships (1) and (2):

$$0.03 \leq [C]+[N]-13/93\times[Nb] \leq 0.09 \quad (1)$$

$$5\times[Cr]+10\times[Si]+30\times[Nb]-9\times[Ni]-5\times[Mn]-3\times[Cu]-225\times[N]-270\times[C] \leq 40 \quad (2),$$

the steel sheet being 90 percent to 100 percent martensite on a volume basis and the remainder of the volume of the steel being ferrite, the martensite and the ferrite being formed by subjecting the steel to heating at 900° C. to 1000° C. and hardening by cooling at a cooling rate of air-cooling or higher, the steel sheet having a hardness of 32 to 38 in HRC, a hardness of 32 or more in HRC when the steel is further tempered at 650° C. for one hour, a hardness of 30 or more in HRC when the steel is further tempered at 670° C. for one hour, a Charpy impact value of 50 J/cm² or more, and high corrosion resistance, wherein the steel sheet is in a shape of a disc brake.

3. A method of treating a hot-rolled sheet made of a martensitic stainless steel, the steel comprising:

less than 0.050 mass % carbon, 1.0 mass % or less silicon, 2.0 mass % or less manganese, 0.04 mass% or less phosphorus, 0.010 mass % or less sulfur, 0.2 mass % or less aluminum, chromium in a range of from more than 11.5 mass % to 15.0 mass %, nickel in a range of from 0.5 mass % to 2.0 mass %, copper in a range of from more than 0.50 mass % to 4.0 mass %, niobium in a range of from 0.15 mass % to 0.6 mass %, less than 0.09 mass % nitrogen, and 0.0005 mass % to 0.0050 mass % calcium, and iron and unavoidable impurities, wherein the carbon content, the nitrogen content, the niobium content, the chromium content, the silicon content, the nickel content, the manganese content, and the copper content satisfy the following relationships (1) and (2):

$$0.03 \leq [C]+[N]-13/93\times[Nb] \leq 0.09 \quad (1)$$

$$5\times[Cr]+10\times[Si]+30\times[Nb]-9\times[Ni]-5\times[Mn]-3\times[Cu]-225\times[N]-270\times[C] \leq 40 \quad (2),$$

the method of treating the steel comprises:
stamping the steel to form pieces having a disc brake shape;
heating the pieces of steel at 900° C. to 1000° C.; and
hardening the pieces of steel by cooling at a cooling rate of air-cooling or higher,
wherein the steps of heating and hardening form martensite, the pieces of steel contain 90 percent to 100 percent martensite on a volume basis, and the remainder of the volume of the steel is ferrite, and
wherein the steel pieces have a hardness of 32 to 38 in HRC after the steel is hardened, a hardness of 32 or more in HRC when the steel is further tempered at 650° C. for one hour, a hardness of 30 or more in HRC when the steel is further tempered at 670° C. for one hour, a Charpy impact value of 50 J/cm² or more, and high corrosion resistance.

4. The hot-rolled sheet according to claim 1, further containing 0.02 mass % to 0.3 mass % vanadium.

5. The hot-rolled sheet according to claim 1, further containing one or both of 0.02 mass % to 2.0 mass % molybdenum and 0.02 mass % to 2.0 mass % cobalt.

6. The hot-rolled sheet according to claim 1, further containing one or more of 0.02 mass % to 0.3 mass % titanium, 0.02 mass % to 0.3 mass % zirconium, and 0.02 mass % to 0.3 mass % tantalum.

7. The hot-rolled sheet according to claim 1, further containing 0.0005 mass % to 0.0050 mass % boron.

8. The cold-rolled sheet according to claim 2, further containing 0.02 mass % to 0.3 mass % vanadium.

9. The cold-rolled sheet according to claim 2, further containing one or both of 0.02 mass % to 2.0 mass % molybdenum and 0.02 mass % to 2.0 mass % cobalt.

10. The cold-rolled sheet according to claim 2, further containing one or more of 0.02 mass % to 0.3 mass % titanium, 0.02 mass % to 0.3 mass % zirconium, and 0.02 mass % to 0.3 mass % tantalum.

11. The cold-rolled sheet according to claim 2, further containing 0.0005 mass % to 0.0050 mass % boron.

12. The method of treating a hot-rolled sheet according to claim 3, wherein the steel further contains 0.02 mass % to 0.3 mass % vanadium.

13. The method of treating a hot-rolled sheet according to claim 3, wherein the steel further contains one or both of 0.02 mass % to 2.0 mass % molybdenum and 0.02 mass % to 2.0 mass % cobalt.

14. The method of treating a hot-rolled sheet according to claim 3, wherein the steel further contains one or more of 0.02 mass % to 0.3 mass % titanium, 0.02 mass % to 0.3 mass % zirconium, and 0.02 mass % to 0.3 mass % tantalum.

15. The method of treating a hot-rolled sheet according to claim 3, wherein the steel further contains 0.0005 mass % to 0.0050 mass % boron.

16. A method of treating a cold-rolled sheet made of a martensitic stainless steel, the steel comprising:

less than 0.050 mass % carbon, 1.0 mass % or less silicon, 2.0 mass % or less manganese, 0.04 mass % or less phosphorus, 0.010 mass % or less sulfur, 0.2 mass % or less aluminum, chromium in a range of from more than 11.5 mass % to 15.0 mass %, nickel in a range of from 0.5 mass % to 2.0 mass %, copper in a range of from more than 0.50 mass % to 4.0 mass %, niobium in a range of from 0.15 mass % to 0.6 mass %, less than 0.09 mass % nitrogen, 0.0005 mass % to 0.0050 mass % calcium, and iron and unavoidable impurities, wherein the carbon content, the nitrogen content, the niobium content, the chromium content, the silicon content, the nickel content, the manganese content, and the copper content satisfy the following relationships (1) and (2):

$$0.03 \leq [C]+[N]-13/93\times[Nb] \leq 0.09 \quad (1)$$

$$5\times[Cr]+10\times[Si]+30\times[Nb]-9\times[Ni]-5\times[Mn]-3\times[Cu]-225\times[N]-270\times[C] \leq 40 \quad (2),$$

the method of treating the steel comprises:
stamping the steel to form pieces having a disc brake shape;
heating the pieces of steel at 900° C. to 1000° C.; and
hardening the pieces of steel by cooling at a cooling rate of air-cooling or higher,
wherein the steps of heating and hardening form martensite, the steel pieces contain 90 percent to 100 percent martensite on a volume basis, and the remainder of the volume of the steel is ferrite, and
wherein the steel pieces have a hardness of 32 to 38 in HRC after the steel is hardened, a hardness of 32 or more in HRC when the steel is further tempered at 650° C. for one hour, a hardness of 30 or more in HRC when the steel is further tempered at 670° C. for one hour, a Charpy impact value of 50 J/cm² or more, and high corrosion resistance.

17. The method of treating a cold-rolled sheet according to claim 16, wherein the steel further contains 0.02 mass % to 0.3 mass % vanadium.

18. The method of treating a cold-rolled sheet according to claim 16, wherein the steel further contains one or both of 0.02 mass % to 2.0 mass % molybdenum and 0.02 mass % to 2.0 mass % cobalt.

19. The method of treating a cold-rolled sheet according to claim 16, wherein the steel further contains one or more of 0.02 mass % to 0.3 mass % titanium, 0.02 mass % to 0.3 mass % zirconium, and 0.02 mass % to 0.3 mass % tantalum.

20. The method of treating a cold-rolled sheet according to claim 16, wherein the steel further contains 0.0005 mass % to 0.0050 mass % boron.

21. A stainless steel sheet comprising:

less than 0.050 mass % carbon, 1.0 mass % or less silicon, 2.0 mass % or less manganese, 0.04 mass % or less phosphorus, 0.010 mass % or less sulfur, 0.2 mass % or less aluminum, chromium in a range of from more than 11.5 mass % to 15.0 mass %, nickel in a range of from 0.5 mass % to 2.0 mass %, copper in a range of from more than 0.50 mass % to 4.0 mass %, niobium in a range of from 0.15 mass % to 0.6 mass %, less than 0.09 mass % nitrogen, 0.0005 mass % to 0.0050 mass % calcium, and iron and unavoidable impurities, wherein the carbon content, the nitrogen content, the niobium content, the chromium content, the silicon content, the nickel content, the manganese content, and the copper content satisfy the following relationships (1) and (2):

$$0.03 \leq [C]+[N]-13/93\times[Nb] \leq 0.09 \quad (1)$$

$$5\times[Cr]+10\times[Si]+30\times[Nb]-9\times[Ni]-5\times[Mn]-3\times[Cu]-225\times[N]-270\times[C] \leq 40 \quad (2),$$

the stainless steel sheet being at a temperature from 900° C. to 1000° C. and being at least 90% austenite at the temperature from 900° C. to 1000° C.

* * * * *

UNITED STATES PATENT AND TRADEMARK OFFICE
CERTIFICATE OF CORRECTION

PATENT NO. : 8,357,247 B2  Page 1 of 1
APPLICATION NO. : 10/546248
DATED : January 22, 2013
INVENTOR(S) : Junichiro Hirasawa et al.

It is certified that error appears in the above-identified patent and that said Letters Patent is hereby corrected as shown below:

Title Page, Item (54) and in the specification, Col. 1 should read

Martensitic Stainless Steel for ~~Disk~~ Disc Brakes

Signed and Sealed this
Second Day of April, 2013

Teresa Stanek Rea
*Acting Director of the United States Patent and Trademark Office*